US012174578B2

(12) United States Patent
Obana

(10) Patent No.: US 12,174,578 B2
(45) Date of Patent: Dec. 24, 2024

(54) HOUSING STRUCTURE AND IMAGE FORMING APPARATUS

(71) Applicant: Akimitsu Obana, Kanagawa (JP)

(72) Inventor: Akimitsu Obana, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/256,840

(22) PCT Filed: Feb. 17, 2022

(86) PCT No.: PCT/IB2022/051402
§ 371 (c)(1),
(2) Date: Jun. 9, 2023

(87) PCT Pub. No.: WO2022/189875
PCT Pub. Date: Sep. 15, 2022

(65) Prior Publication Data

US 2024/0019807 A1 Jan. 18, 2024

(30) Foreign Application Priority Data

Mar. 10, 2021 (JP) ................................ 2021-038407

(51) Int. Cl.
*G03G 21/16* (2006.01)

(52) U.S. Cl.
CPC ................................ *G03G 21/1619* (2013.01)

(58) Field of Classification Search
CPC .................................................. G03G 21/1619
See application file for complete search history.

(56) References Cited

U.S. PATENT DOCUMENTS

| | | | | |
|---|---|---|---|---|
| 5,966,568 A * | 10/1999 | Numagami | ........ | G03G 21/1846 399/119 |
| 2013/0108315 A1* | 5/2013 | Watanabe | .......... | G03G 21/1619 399/107 |
| 2017/0247210 A1* | 8/2017 | Lawrence | .......... | G03G 21/1619 |

FOREIGN PATENT DOCUMENTS

| | | |
|---|---|---|
| JP | H05-289422 A | 11/1993 |
| JP | 5-323687 | 12/1993 |
| JP | 2000-162860 A | 6/2000 |
| JP | 2002-207408 | 7/2002 |
| JP | 3613508 | 1/2005 |

(Continued)

OTHER PUBLICATIONS

International Search Report and Written Opinion issued on May 31, 2022 in PCT/IB2022/051402 filed on Feb. 17, 2022.

(Continued)

*Primary Examiner* — Sandra Brase

(74) *Attorney, Agent, or Firm* — Harness, Dickey & Pierce, P.L.C.

(57) ABSTRACT

A housing structure includes a lower housing, an upper housing, and a cover. The upper housing is mounted on the lower housing and includes a recessed hand grip on a side surface of the upper housing. The cover covers at least a part of the recessed hand grip of the upper housing. The cover is attached and secured to the lower housing from a direction perpendicular to the side surface of the upper housing. The cover includes at least a part of a temporary securing structure between the upper housing and the cover. The temporary securing structure temporarily secures the cover to the upper housing when the cover is attached from the direction perpendicular to the side surface of the upper housing.

20 Claims, 10 Drawing Sheets

(56) References Cited

FOREIGN PATENT DOCUMENTS

| | | | |
|---|---|---|---|
| JP | 2006-235189 | | 9/2006 |
| JP | 2012150151 | * | 8/2012 |
| JP | 2013-082102 | | 5/2013 |

OTHER PUBLICATIONS

JP Office Action for corresponding Japanese Patent Application No. 2021-038407 issued on Aug. 2, 2024.

* cited by examiner

HOUSING STRUCTURE AND IMAGE FORMING APPARATUS

This application is a national phase under 35 U.S.C. § 371 of PCT International Application No. PCT/IB2022/051402 which has an International filing date of Feb. 17, 2022, which claims priority to Japanese Application No. 2021-038407, filed Mar. 10, 2021, the entire contents of each of which are hereby incorporated by reference.

TECHNICAL FIELD

Embodiments of the present disclosure relate to a housing structure and an image forming apparatus.

BACKGROUND ART

There is known a housing structure that includes a lower housing, an upper housing mounted on the lower housing, and a cover for covering at least a part of a recessed hand grip disposed in the lower housing. For example, PTL 1 discloses an image forming apparatus that includes a main unit as an upper housing and an optional device as a lower housing additionally installed with the main unit. The image forming apparatus further includes a hand grip as a recessed hand grip disposed in the main unit and a cover, which covers the hand grip, disposed in the optional device. The image forming apparatus fully covers the hand grip disposed in the main unit of the image forming apparatus with the cover. Thus, the hand grip in the main unit of the image forming apparatus cannot be held by a user in any circumstances. Accordingly, operability can be further enhanced without causing misunderstanding of the user.

CITATION LIST

Patent Literature

[PTL 1]
Japanese Unexamined Patent Application Publication No. 2012-150151

SUMMARY OF INVENTION

Technical Problem

However, in the above-described image forming apparatus, there remains room for improvement in terms of simplification of the structure for mounting and securing the cover and enhancement in workability of the mounting and securing of the cover.

Solution to Problem

In light of the above-described problem, an object of the present disclosure is to provide a housing structure includes a lower housing, an upper housing, and a cover. The upper housing is mounted on the lower housing and includes a recessed hand grip on a side surface of the upper housing. The cover covers at least a part of the recessed hand grip of the upper housing. The cover is attached and secured to the lower housing from a direction perpendicular to the side surface of the upper housing. The cover includes at least a part of a temporary securing structure between the upper housing and the cover. The temporary securing structure temporarily secures the cover to the upper housing when the cover is attached from the direction perpendicular to the side surface of the upper housing.

Advantageous Effects of Invention

According to the present disclosure, a housing structure to which a cover can be easily attached and secured can be adopted, and the workability of attaching and securing of the cover can be enhanced.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
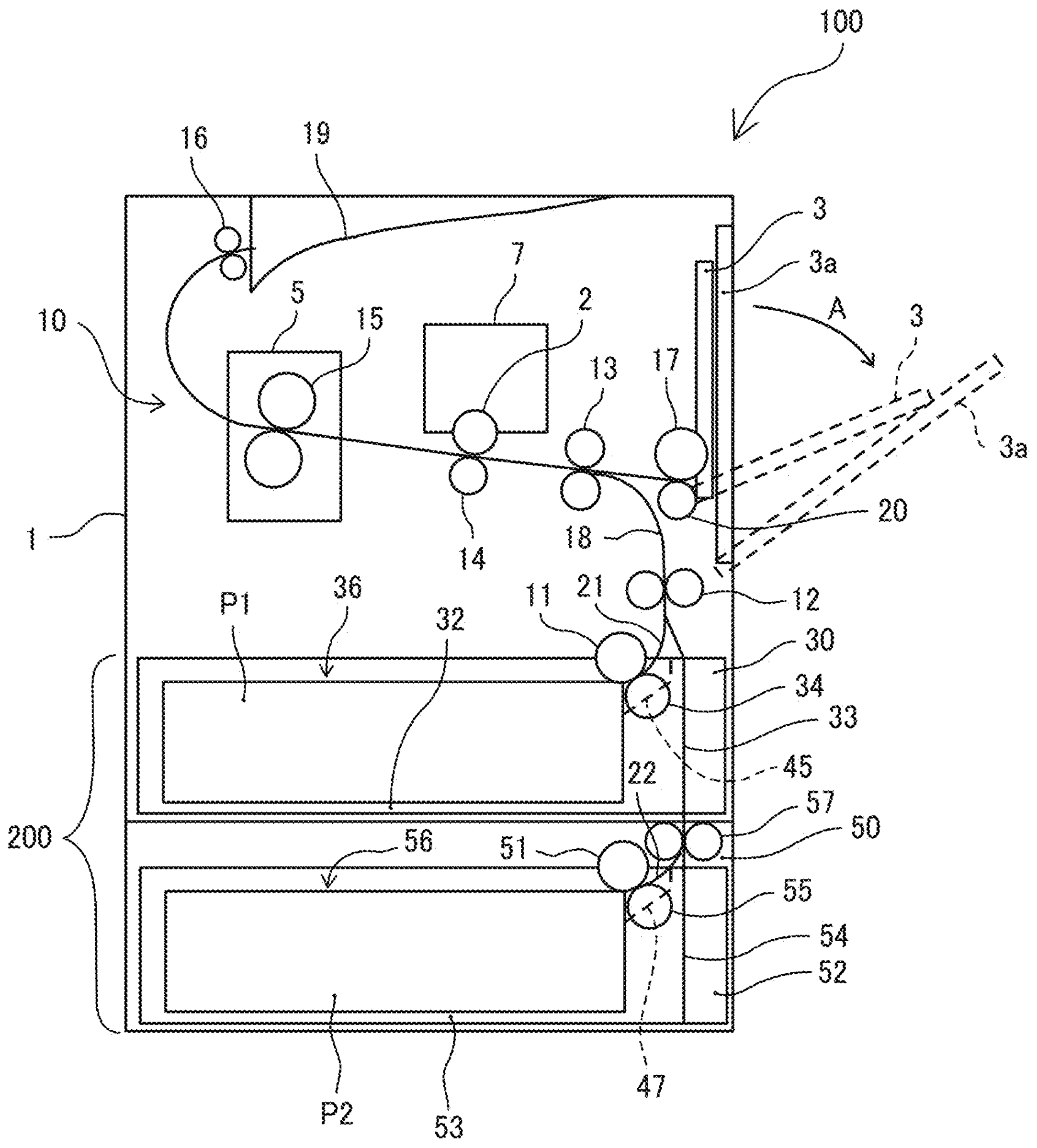
FIG. 1 is a schematic diagram illustrating a configuration of a printer according to an embodiment of the present disclosure.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 2:
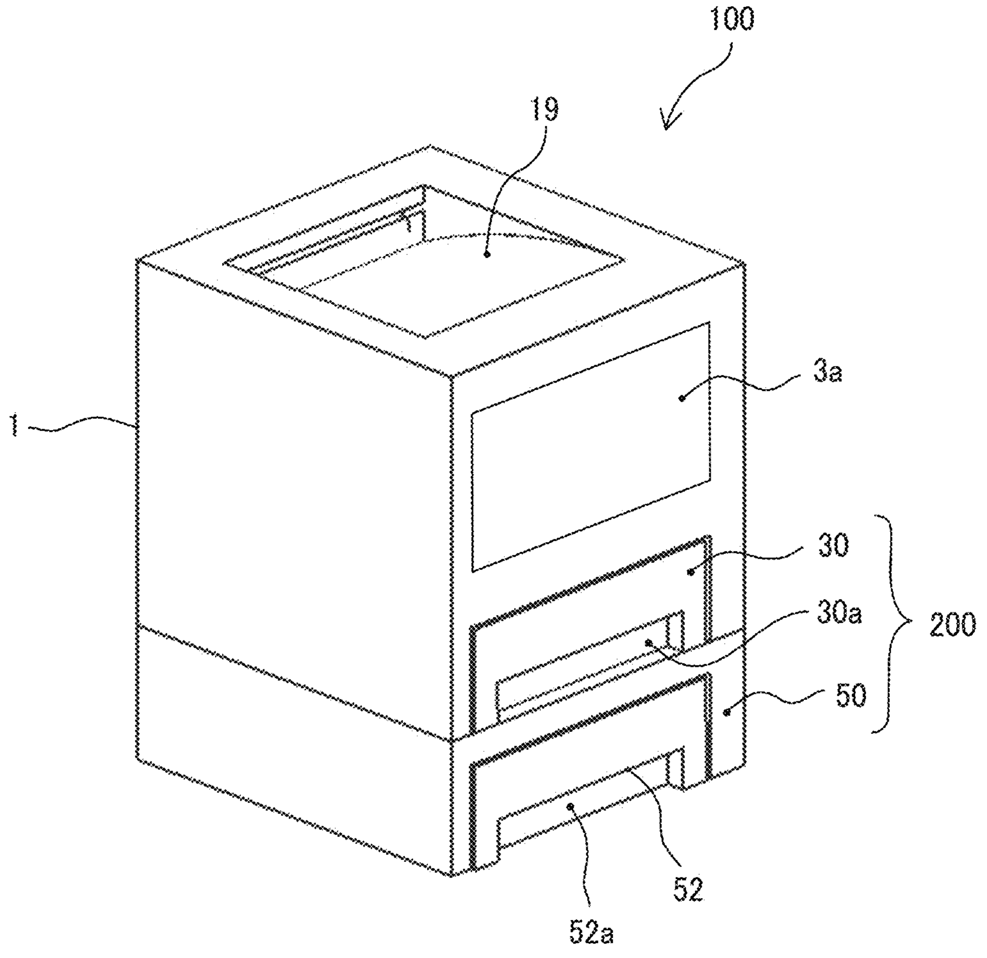
FIG. 2 is a schematic perspective view of the printer of FIG. 1.

A description is given below of an electrophotographic printer, which is referred to simply as a "printer" in the following description, that forms images by an electrophotographic method as an image forming apparatus having a housing structure according to embodiments of the present disclosure. First, a description is given of a printer 100 according to an embodiment of the present disclosure. FIG. 1 is a schematic diagram illustrating a configuration of the printer 100 according to the present embodiment. FIG. 2 is a schematic perspective view of the printer 100 according to the present embodiment. The printer 100 includes a main-unit housing 1 and an extension sheet feeder 50. The main-unit housing 1 includes an image forming device 10. The extension sheet feeder 50 is installed below the main-unit housing 1. The main-unit housing 1 serves as an upper housing of the printer 100. The extension sheet feeder 50 serves as a lower housing of the printer 100.

As illustrated in FIG. 1, the main-unit housing 1 includes, below the image forming device 10, a main-unit sheet tray 30, a main-unit sheet feeding roller 11, a main-unit sheet-feed conveyance path 21, a main-unit conveyance roller pair 12, and a main-unit conveyance path 18. The extension sheet feeder 50 includes an extension sheet tray 52 and an extension sheet feeding roller 51. The main-unit sheet tray 30 and the extension sheet tray 52 are arranged so as to be drawn out from the main-unit housing 1 and from a housing of the extension sheet feeder 50, respectively, toward a front side of the printer 100, which is a right side in FIG. 1. As illustrated in FIG. 2, the printer 100 includes a main-unit tray handle 30*a* and an extension tray handle 52*a* for pulling out the main-unit sheet tray 30 and the extension sheet tray 52, respectively. The main-unit sheet tray 30 in the main-unit housing 1 and the extension sheet feeder 50 serve as a sheet feeder as a sheet feeder 200.

As illustrated in FIG. 1, the main-unit sheet tray 30 includes a main-unit sheet tray housing 32, main-unit feed separation rollers 34, and a main-unit sheet feed guide 45. The main-unit sheet tray housing 32 includes a main-unit sheet stacker 36 on which a first sheet bundle P1 is stacked. The main-unit sheet tray 30 also includes a main-unit sheet tray conveyance path 33 through which a sheet from the extension sheet tray 52 passes. The extension sheet tray 52 includes an extension sheet tray housing 53, extension sheet feeding separation rollers 55, an extension sheet feed guide 47, and an extension conveyance roller pair 57. The extension sheet tray housing 53 includes an extension sheet stacker 56 on which a second sheet bundle P2 is stacked. The extension sheet tray 52 also includes an extension sheet tray conveyance path 54. An additional one of the extension sheet tray 52 having an approximately same shape can be added below the above-described extension sheet tray 52.

The main-unit housing 1 includes a bypass sheet feeding tray 3 and a bypass sheet feeding tray exterior cover 3*a* on the front side of the printer 100, i.e., the right side in FIG. 1. When the bypass sheet feeding tray exterior cover 3*a* is rotated in a direction indicated by arrow A in FIG. 1 and moved to a position indicated by the broken line in FIG. 1, the bypass sheet feeding tray 3 is moved to a position indicated by another broken line in FIG. 1 in conjunction with the movement of the bypass sheet feeding tray exterior cover 3*a*. Thus, a bypass sheet feed unit in which a sheet is conveyed by bypass sheet feeding rollers 17 is made up.

The image forming device 10 includes a photoconductor 2 as a latent image carrier, an image forming device 7, a transfer roller 14, and a fixing device 5. The image forming device 7 forms a toner image on the surface of the photoconductor 2. The transfer roller 14 transfers the toner image on the surface of the photoconductor 2 to a sheet. The fixing device 5 fixes the transferred toner image to the sheet.

When the printer 100 forms an image, a latent image is formed on the surface of the photoconductor 2 by an exposure device provided for the image forming device 7, and the latent image on the surface of the photoconductor 2 is developed by a developing device provided for the image forming device 7. Thus, a toner image is formed on the surface of the photoconductor 2. On the other hand, from a sheet bundle stacked on the main-unit sheet tray 30, the extension sheet tray 52, or the bypass sheet feeding tray 3, sheets conveyed one by one by the main-unit sheet feeding rollers 11, the extension sheet feeding rollers 51, or the bypass sheet feeding rollers 17 are conveyed to a position at which the sheets contact the registration roller pair 13.

The registration roller pair 13 is rotationally driven so as to match a timing at which the toner image on the surface of the photoconductor 2 reaches a transfer nip which is a portion facing the transfer roller 14 and the toner image on the surface of the photoconductor 2 is transferred onto a surface of the sheet at the transfer nip. The toner image is fixed by heat and pressure in the fixing device 5 onto the sheet on which the toner image has been transferred, and the sheet is ejected by an ejection roller pair 16 to an output tray 19.

Figure 3:
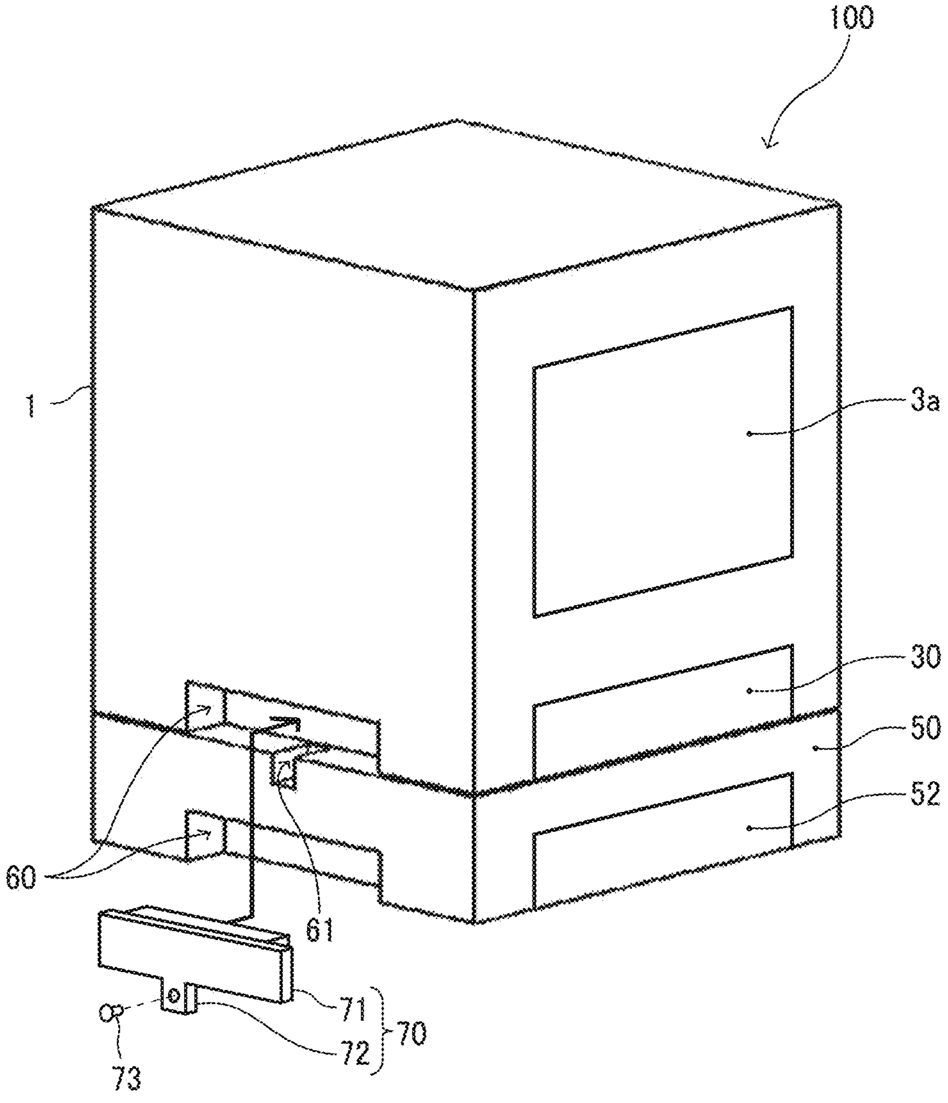
FIG. 3 is a schematic perspective view of a printer mounted on an extension sheet feeder illustrating recessed hand grips disposed on a side surface of the printer and how a securing member as a cover is fitted to the recessed hand grip, according to an embodiment of the present disclosure.

Next, descriptions are given below of the housing structure of the printer 100 including recessed hand grips 60, according to the present embodiment. The housing structure of the printer 100 according to the present embodiment includes the extension sheet feeder 50 as the lower housing, the main-unit housing 1 as the upper housing mounted on the lower housing, and a securing member 70. The main-unit housing 1 as the upper housing includes the recessed hand grip 60 on each of the side surfaces of the main-unit housing 1. The securing member 70 serves as a cover that covers at least a part of the recessed hand grip 60 provided for the lower housing, as the basic configuration. FIG. 3 is a schematic perspective view of the printer 100 with recessed hand grips 60, according to the present embodiment. The main-unit housing 1 is mounted on the extension sheet feeder 50. The recessed hand grip 60 is formed at a lowermost portion of the left side surface of the main-unit housing 1. The recessed hand grip 60 is a carrying handle formed on the outer surface of the main-unit housing 1. The right-side surface of the main-unit housing 1, which is opposite to the left side surface of the main-unit housing 1, is also provided with the recessed hand grip 60 having the approximately same shape at a position corresponding to the lowermost portion of the left side surface of the main-unit housing 1.

Figure 4:
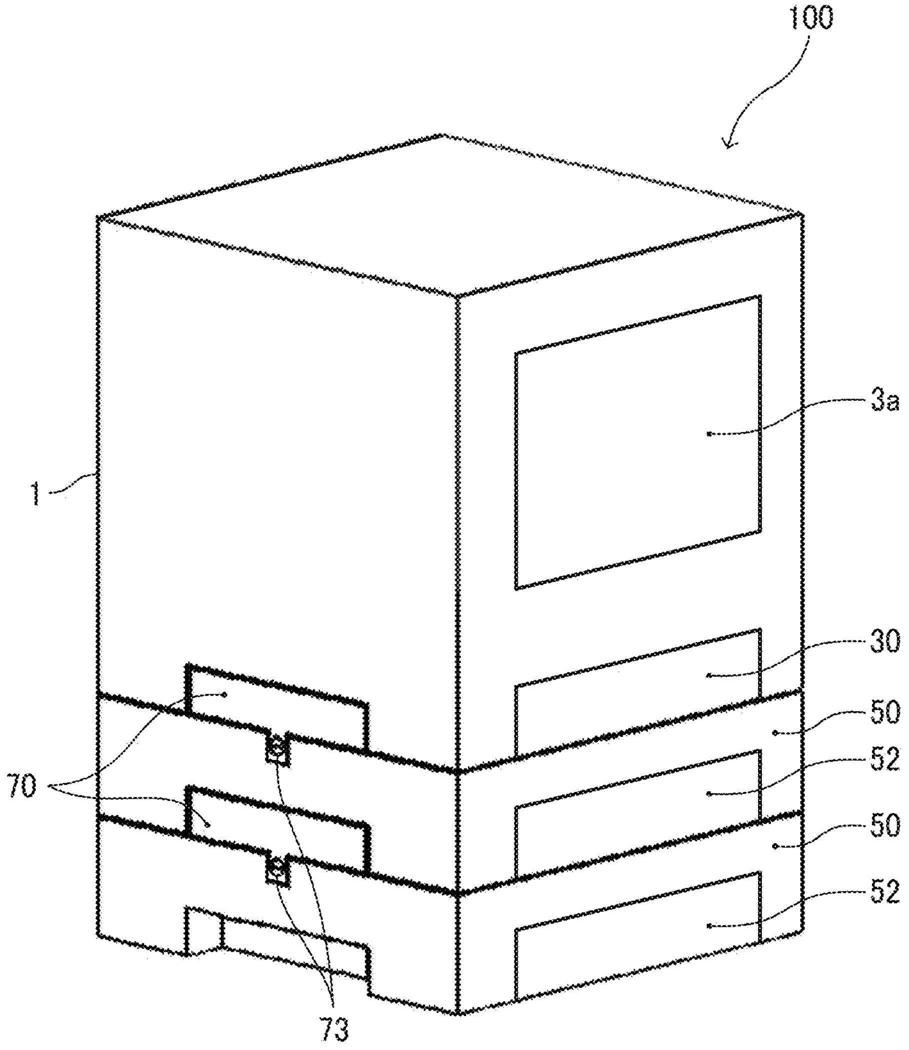
FIG. 4 is a schematic perspective view of a printer mounted on two extension sheet feeders stacked in two stages in which each of recessed hand grips disposed on a side surface of the printer is covered by a securing member serving as a cover, according to an embodiment of the present disclosure.

The printer 100, as a desktop apparatus, includes the recessed hand grip 60 in the vicinity of the bottom surface of the right-side surface and the left-side surface of the main-unit housing 1. The extension sheet feeder 50 is an optional device generally added to and installed in the printer 100. As illustrated in FIG. 4, the multiple extension sheet feeders 50 may be installed in the printer 100. FIG. 4 illustrates an example in which the two extension sheet feeders 50 are installed. Each of the extension sheet feeders 50 is secured to each other using the securing members 70. The upper extension sheet feeder 50 and the main-unit housing 1 are secured to each other also using the securing members 70. The securing members 70 illustrated in FIG. 4 have substantially the same structure as the securing member 70 described with reference to FIG. 3. In other words, the securing members 70 having substantially the same structure are used at the above-described two positions illustrated in FIG. 4.

It is preferable that the main-unit housing 1 and the extension sheet feeder 50 are secured with the securing members 70, or the extension sheet feeder 50 and the other extension sheet feeder 50 are secured with the securing members 70. Such a configuration as described above prevents the main-unit housing 1 and the extension sheet feeder 50 on which the main-unit housing 1 is mounted from separating from each other and falling when the printer 100 is obliquely installed or a load from a lateral side of the printer 100 is generated, for example, when a person or an object contacts the printer 100. The above-described configuration can also prevent the upper extension sheet feeder 50 and the lower extension sheet feeder 50 from separating from each other and falling.

As illustrated in FIG. 3, the securing member 70 includes an insertion portion 71 that is inserted into the recessed hand grip 60 and covers the recessed hand grip 60, and a lower screw fastening portion 72 that secures the securing member 70 with a screw 73. The securing member 70 has a function of covering all or a part of the recessed hand grip 60. Thus, the securing member 70 serves as the cover. The securing member 70 is attached from a direction perpendicular to the side surface of the printer 100 on which the recessed hand grip 60 is formed, and is secured to the extension sheet feeder 50 by the screw 73 that serves as a fastening member. A recess 61 into which the screw fastening portion 72 of the securing member 70 is inserted is also formed on a side surface of the extension sheet feeder 50. The securing member 70 can be simply attached to the exterior surface, i.e., exterior member, of the printer 100 from the direction perpendicular to the side surface of the printer 100. Accordingly, the workability of attaching the securing member 70 is enhanced. The securing member 70 having substantially the same shape as the other securing member 70 is attached and secured to the recessed hand grip 60 on the right-side surface of the printer 100 which is a side surface opposite to the left-side surface illustrated in FIG. 3.

The securing member 70 that is secured to the extension sheet feeder 50 as the lower housing includes a coupling portion to perform the above-described function of preventing the printer 100 from falling. Such a coupling portion, desirably, allows the securing members 70 to engage with the main-unit housing 1 as the upper housing of the printer 100 and restrict relative movement of the upper housing of the printer 100 in accordance with a desired degree of preventing the printer 100 from falling. When the insertion portion 71 of the securing member 70 is fitted into the recessed hand grip 60, members of the main-unit housing 1 and the extension sheet feeder 50 including the recessed hand grip 60 can be restricted from moving in the vertical direction and the horizontal direction. Regarding the movement in the direction perpendicular to the side surface of the printer 100, the members of the main-unit housing 1 and the extension sheet feeder 50 including the recessed hand grip 60 are restricted from moving outside of the side surface of the printer 100. The members of the main-unit housing 1 and the extension sheet feeder 50 including the recessed hand grip 60 are not restricted from moving toward the rear side of the side surface of the printer 100. However, in a configuration in which the recessed hand grip 60 and the securing member 70 having substantially the same configuration as the recessed hand grip 60 on the side surface of the printer 100 are disposed on the opposite side surface of the printer 100, the members of the main-unit housing 1 and the extension sheet feeder 50 including the recessed hand grip 60 are restricted from moving outside of the side surface of the printer 100 on each of the side surfaces. Accordingly, the movement of the members of the main-unit housing 1 and the extension sheet feeder 50 including the recessed hand grip 60 can be restricted in all three directions. Whether restricting the members of the main-unit housing 1 and the extension sheet feeder 50 including the recessed hand grip 60 from moving in all directions and the degree of margin in restricting the movement depends on the desired degree of fall prevention. Note that a configuration of a coupling portion that engages with the recessed hand grip 60 or the securing member 70, according to another embodiment, which is described later with reference to, for example, FIG. 5, may be employed for the securing member 70 illustrated in FIGS. 3 and 4.

The securing member 70 specifies a position of the printer 100 to be held by hand, in addition to the function of fall prevention. For example, as illustrated in FIG. 4, when each of the securing member 70 is attached to the corresponding one of the recessed hand grips 60, the outer contour of the securing member 70 occupies and covers a recess of the recessed hand grip 60. Such a configuration can prevent holding of the recessed hand grips 60 other than the recessed hand grips 60 of the extension sheet feeder 50 as a lowermost housing. Accordingly, if the main-unit housing 1 and the extension sheet feeder 50 are conveyed in a state in which the main-unit housing 1 and the extension sheet feeder 50 are secured to each other, holding the extension sheet feeder 50 as the lowermost housing can eliminate a risk that the extension sheet feeder 50 may fall while the main-unit housing 1 and the extension sheet feeder 50 are conveyed. On the other hand, when the recessed hand grip 60 positioned between the main-unit housing 1 and the extension sheet feeder 50 as the lowermost housing is held, there is a possibility that the extension sheet feeder 50 may fall due to the weight of the extension sheet feeder 50, breakage of the securing member 70, or an unexpected event. Accordingly, injury or breakage of the extension sheet feeder 50 might occur. In FIG. 4, a configuration in which the main-unit housing 1 and the upper extension sheet feeder 50 are secured to each other and a configuration in which the upper extension sheet feeder 50 and the lower extension sheet feeder 50 are secured to each other are substantially the same.

A clearance between the recessed hand grip 60 and the securing member 70, which is a clearance between the opening of the recessed hand grip 60 and the peripheral edge of the securing member 70, is set to be equal to or smaller than 5 mm, as indicated by Underwriters Laboratories (UL) 1459 (UL Standard for Safety Telephone Equipment) which specifies a clearance for a tip of a test finger to be less than 5 mm. Such a configuration prevents a small finger such as a finger of a child from entering. Accordingly, the securing member 70 can reliably prevent holding of the recessed hand grip 60 of, for example, the main-unit housing 1 or the upper extension sheet feeder 50. Not only the clearance is formed as described above, but also the outer surface of the main-unit housing 1 and the extension sheet feeder 50 and the outer surface of the securing member 70 form substantially a same surface or the difference in height between the outer surface of the main-unit housing 1 and the extension sheet feeder 50 and the outer surface of the securing member 70 is equal to or smaller than 5 mm. Thus, there is no difference in height therebetween substantially. Accordingly, the securing member 70 can reliably prevent holding of the recessed hand grip 60. When the upper extension sheet feeder 50 and the lower extension sheet feeder 50 are stacked in two stages and secured to each other, a configuration similar to the above-described configuration can be employed. Accordingly, the securing member 70 can reliably prevent holding of the recessed hand grip 60.

In the present embodiment, at least a part of a temporary securing structure of the securing member 70 is formed between the securing member 70 and the main-unit housing 1 when the securing member 70 is attached from a direction perpendicular to the side surface of the securing member 70. A configuration example of the temporary securing structure is described using a specific example of a structure of the securing member 70 including two screw securing portions for securing the securing member 70 to the lower housing and the recessed hand grip 60 provided for the above-described securing member 70.

Figure 5:
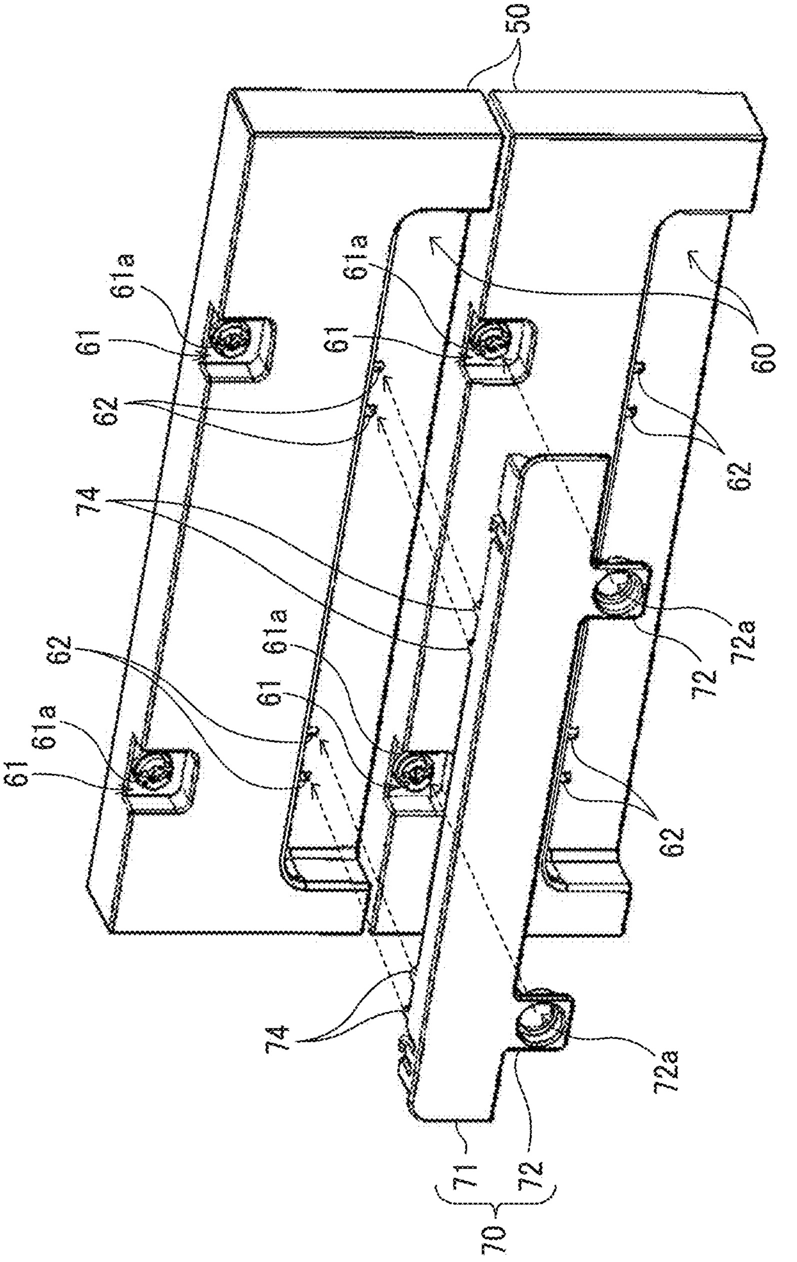
FIG. 5 is a perspective view of a securing member illustrating how the securing member is attached to side surfaces of two extension sheet feeders provided for a printer, according to an embodiment of the present disclosure.

FIG. 5 is a perspective view of the securing member 70 illustrating how the securing member 70 is attached to side surfaces of the two extension sheet feeders 50, according to the present embodiment. In the securing member 70, a pair of the screw fastening portions 72 are disposed at positions symmetrical on both sides of the securing member 70 in the width direction. The example of FIG. 5 illustrates how the securing member 70 is attached between the two extension sheet feeders 50 stacked in two stages to secure the two extension sheet feeders 50. The insertion portion 71 of the securing member 70 includes protrusions 74. In the recessed hand grip 60 provided for the upper extension sheet feeder 50, openings 62 or recesses into which the protrusions 74 of the securing member 70 enter are formed in a back surface portion 63 (see FIG. 8) of the recessed hand grip 60. The recess 61 and screw fastening portions 61*a* are formed in the lower extension sheet feeder 50. Each of the screw fastening portions 72 enters into a corresponding one of the recesses 61. The main-unit housing 1 and the upper extension sheet feeder 50 are secured to each other in a similar manner as described above. In other words, in FIG. 5, the case in which the upper extension sheet feeder 50 and the lower extension sheet feeder 50 are secured to each other is illustrated. However, substantially the same configuration can be adopted for securing the main-unit housing 1 and the upper extension sheet feeder 50. The temporary securing structure of the left side surface of the printer 100 is illustrated in FIG. 5. The temporary securing structure is also provided for the right-side surface, i.e., opposite side, of the printer 100.

Figure 8:
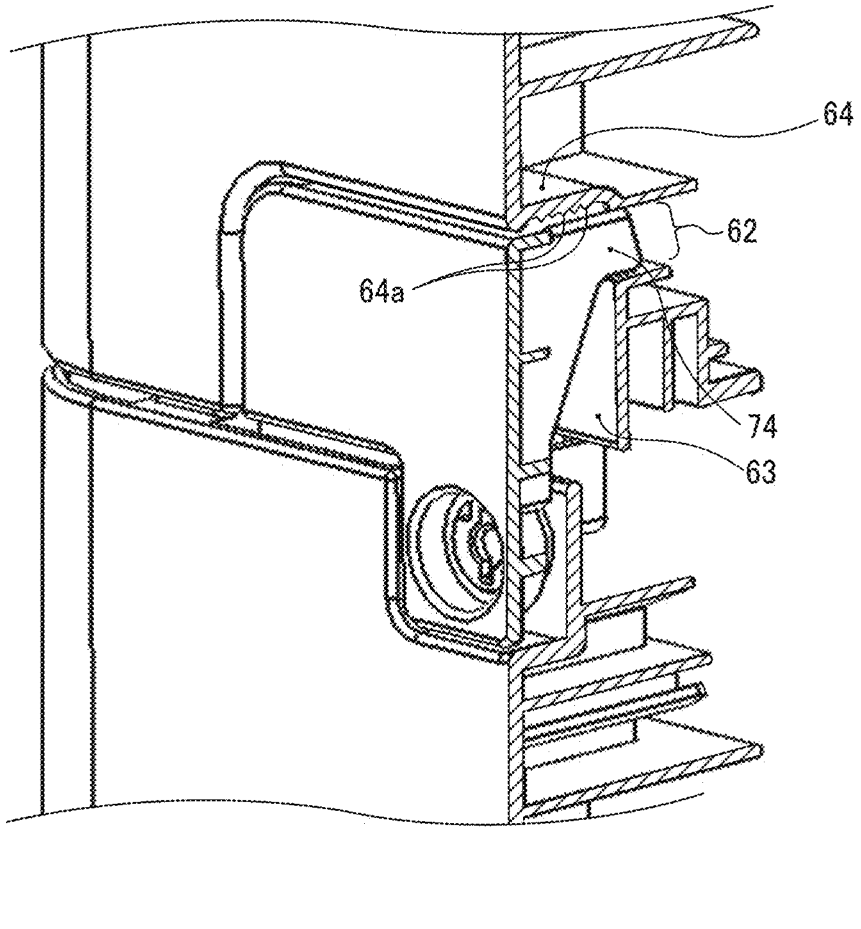
FIG. 8 is an enlarged cross-sectional view of the extension sheet feeders coupled by the securing member taken along the cut line X-X of FIG. 7, according to an embodiment of the present disclosure.
Figure 9:
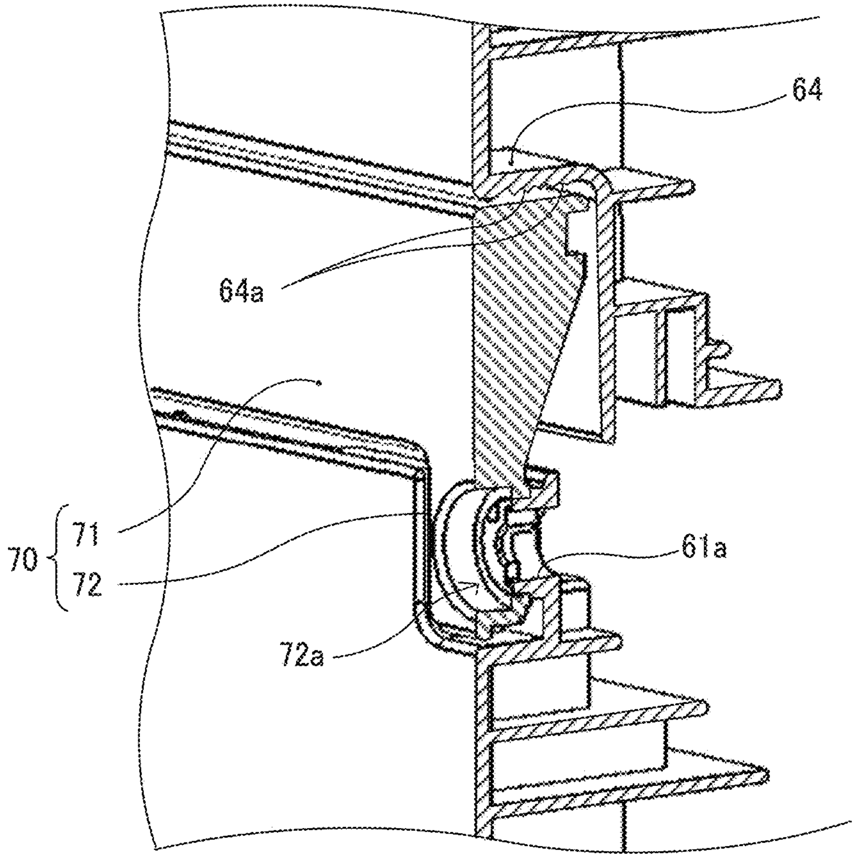
FIG. 9 is an enlarged cross-sectional view of the extension sheet feeders coupled by the securing member taken along the cut line Y-Y of FIG. 7, according to an embodiment of the present disclosure.

As illustrated in FIG. 5, the securing member 70 is secured to the lower extension sheet feeder 50 in a state in which each of the screw fastening portions 61*a*, which are protrusions disposed in the lower extension sheet feeder 50, is inserted into a corresponding one of the openings 72*a* formed in the screw fastening portion 72 of the securing member 70 and is temporarily fastened (see FIG. 9). The screw 73 is fastened as illustrated in FIGS. 3 and 4 to secure the securing member 70 to the lower extension sheet feeder 50. Each of the protrusions 74 of the securing member 70 is inserted into a corresponding one of the openings 62 formed in the recessed hand grip 60 of the upper extension sheet feeder 50 to couple the upper extension sheet feeder 50 with the securing member 70 (see FIG. 8). The reason why the openings 62 are used as coupling portions provided on the back surface portion 63 of the recessed hand grip 60 is that fingers of a person may enter the recessed hand grip 60. If the openings 62 are protrusions, the protrusions may cause pain or injury when the fingers enter the recessed hand grip 60. From this point of view, desirably, the openings 62 or recessed shapes are employed.

Figure 6:
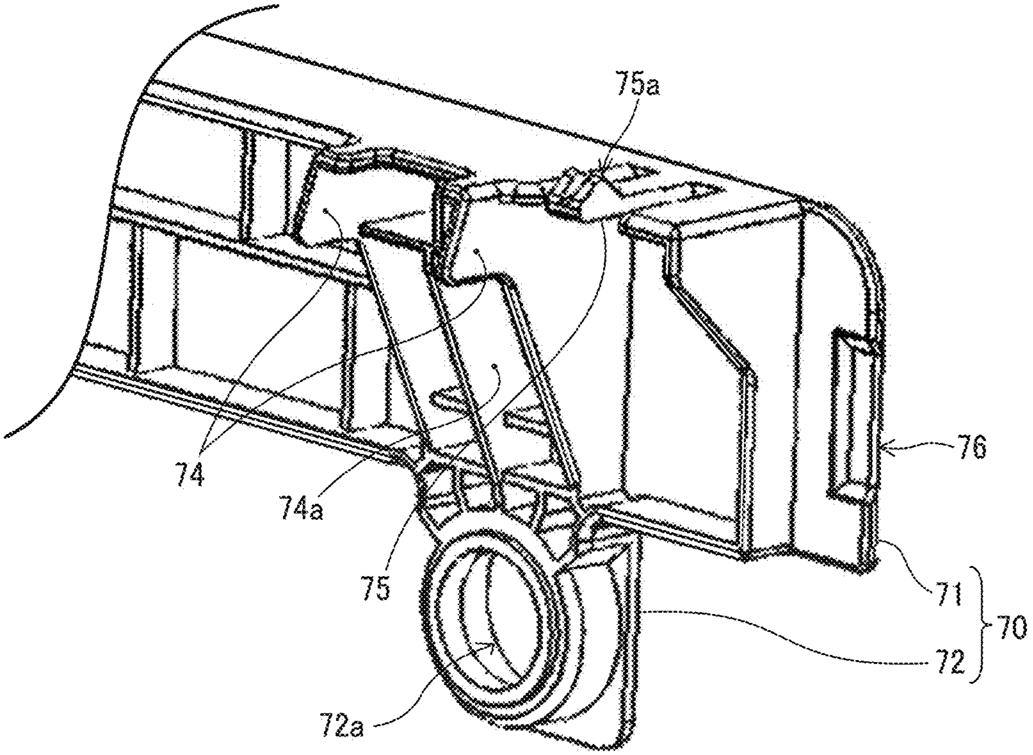
FIG. 6 is a perspective view of the securing member of FIG. 5 viewed from a rear side of the securing member, according to an embodiment of the present disclosure.

FIG. 6 is a perspective view of the securing member 70 viewed from the rear side of the securing member 70, according to the present embodiment. An elastic piece 75 whose tip can be displaced up and down by elastic deformation is formed in the insertion portion 71 of the securing member 70. A tip end 75*a* of the elastic piece 75 is positioned higher than other portions of the insertion portion 71 in a natural state and serves as a hook to hook one of convex ribs 64*a* of a ceiling 64 of the recessed hand grip 60 described later. Further, a thin portion 76 thinner than other portions of the securing member 70 is formed at each of ends, i.e., peripheral portions, of the insertion portion 71.

The reason why the thin portions 76 are disposed one or more ends of the securing member 70 is as follows. After the main-unit housing 1 and the extension sheet feeder 50 have been installed and secured to each other, the securing members 70 need to be removed when the extension sheet feeder 50 is attached to or detached from the main-unit housing 1 due to relocation or repair of the printer 100. As described above, the clearance or the step difference between the securing member 70 and the main-unit housing 1 or the extension sheet feeder 50 or the step difference is small such that fingers may not enter the clearance. Accordingly, the securing member 70 is difficult to remove. In the above-described configuration in which a part of the securing member 70 is thinned, the securing member 70 is easy to remove by insertion of a claw or a flat-head screwdriver into the clearance.

Figure 7:
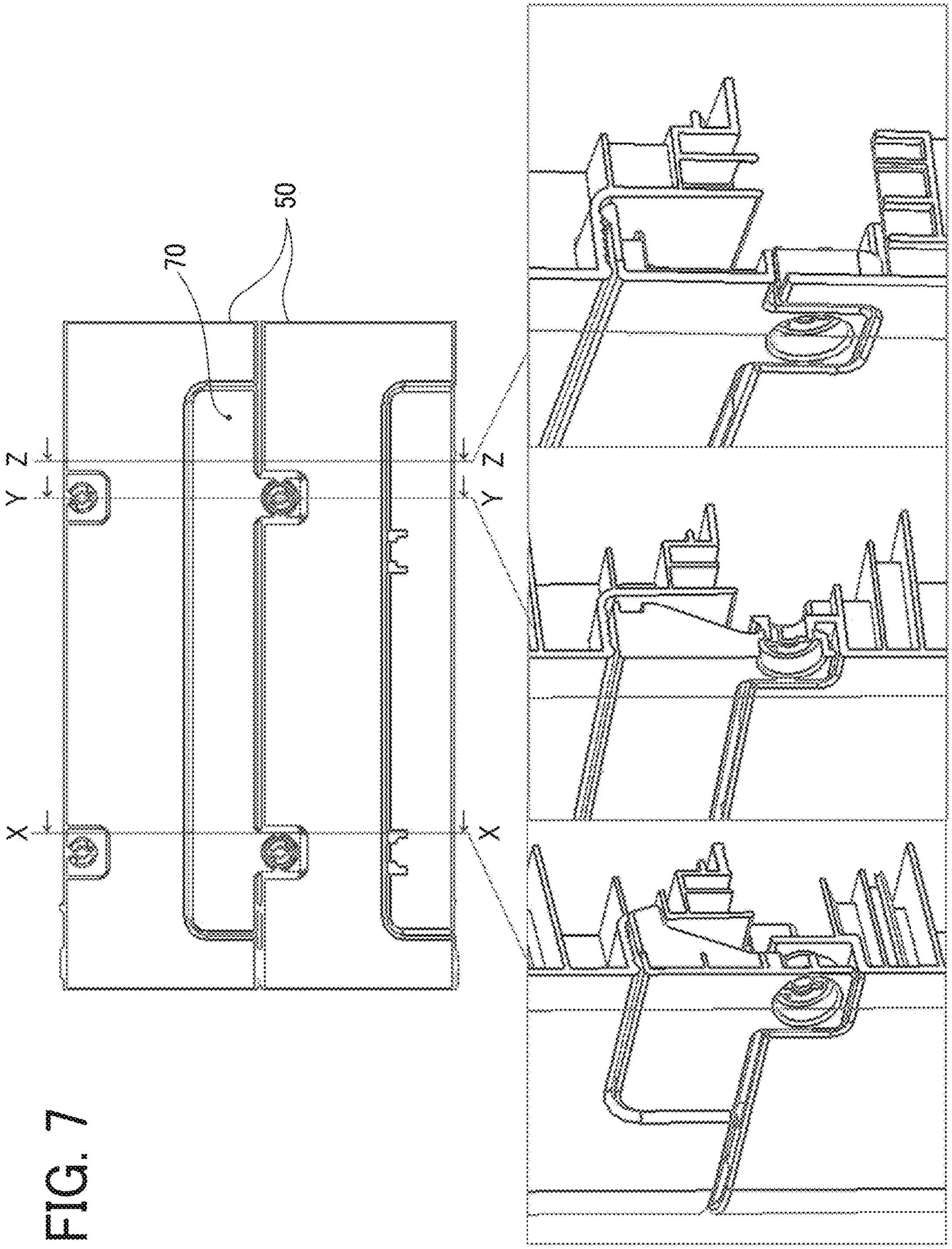
FIG. 7 is a side view of the extension sheet feeders coupled by the securing member of FIG. 5 and illustrates cross-sectional views of the extension sheet feeders and the securing member taken along cut lines X-X, Y-Y, and Z-Z, according to an embodiment of the present disclosure.
Figure 10:
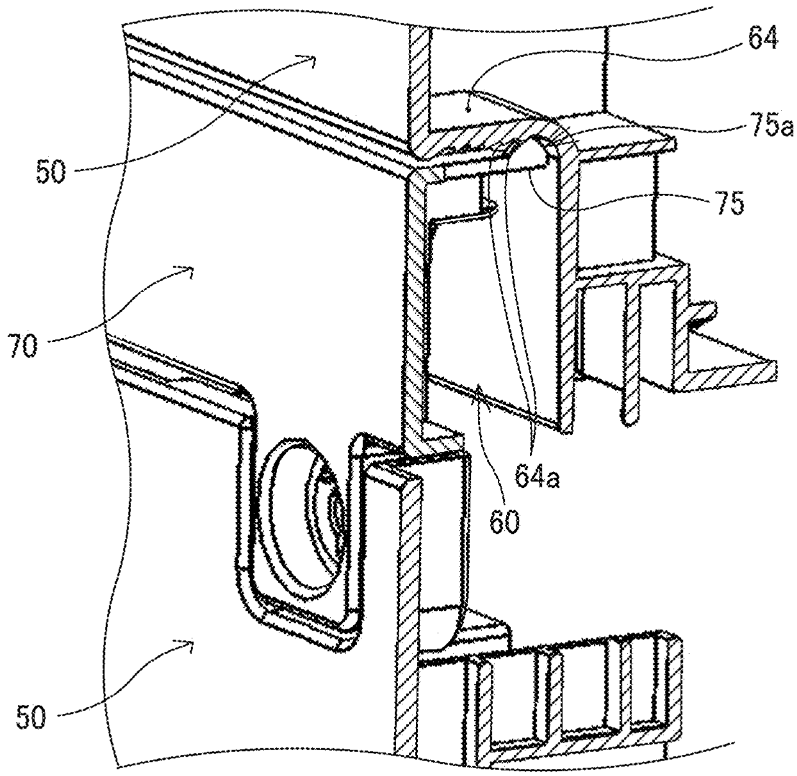
FIG. 10 is an enlarged cross-sectional view of the extension sheet feeders coupled by the securing member taken along the cut line Z-Z of FIG. 7, according to an embodiment of the present disclosure.

FIG. 7 is a side view of the extension sheet feeders 50 coupled by the securing member 70 and illustrates cross-sectional views of the extension sheet feeders 50 and the securing member 70 taken along the cut lines X-X, Y-Y, and Z-Z, according to the present embodiment. FIG. 8 is an enlarged cross-sectional view of the extension sheet feeders 50 coupled by the securing member 70 taken along the cut line X-X of FIG. 7. FIG. 9 is a cross-sectional view of the extension sheet feeders 50 coupled by the securing member 70 taken along the cut line Y-Y of FIG. 7. FIG. 10 is a cross-sectional view taken along the cut line Z-Z of FIG. 7. As illustrated in FIG. 8, the protrusion 74 of the securing member 70 enters the opening 62 formed in the back surface portion 63 of the recessed hand grip 60, which serves as a wall of the upper extension sheet feeder 50.

In the present embodiment, the protrusions 74 of the securing member 70 serve as portions that couple the extension sheet feeder 50 with the upper housing. Each of the protrusions 74 enters a corresponding one of the openings 62 formed in the back surface portion 63 of the recessed hand grip 60 of the upper extension sheet feeder 50 illustrated in FIG. 8. Each of the protrusions 74 contacts a lower edge of the opening 62 to restrict upward movement of the upper housing. In addition, an upper portion of each of the protrusions 74 contacts the ceiling 64 of the recessed hand grip 60 to restrict downward movement of the upper housing.

As illustrated in FIG. 6, a rib 74*a* is disposed in the middle between the protrusions 74 in the width direction of the securing member 70. The rib 74*a* contacts the back surface portion 63 of the recessed hand grip 60 as illustrated in FIG. 8, thus, restricting the upper housing from moving from the side surface of the upper housing toward the outside of the side surface of the printer 100. Similarly, the recessed hand grip 60 and the securing member 70 on the opposite side surface of the printer 100 restrict the upper housing from moving from the side surface of the upper housing toward the outside of the side surface of the printer 100. The recessed hand grip 60 and the securing member 70 on both side surfaces of the upper housing cooperate with each other to restrict the lateral movement of the upper housing.

As illustrated in a cross section of the ceiling 64 of the recessed hand grip 60 of FIGS. 8, 9, and 10, a plurality of convex ribs 64*a* extending in the width direction of the recessed hand grip 60 are formed. Portions between each of the convex ribs 64*a* are recessed relative to the convex ribs 64*a*. The convex ribs 64*a* function as slip stoppers when fingertips are put on the recessed hand grip 60 for conveying the printer 100. In other words, the convex ribs 64*a* on the ceiling 64 of the recessed hand grip 60 exhibit a slip-preventing function when the main-unit housing 1 or the extension sheet feeder 50 including the recessed hand grips 60 is held. As illustrated in FIG. 10, one of the convex ribs 64*a* is engaged with the tip end 75*a* of the elastic piece 75 of the securing member 70.

The tip end 75*a* of the elastic piece 75 of the securing member 70 serves as the hook. When the securing member 70 is vertically attached to the side surface of the upper housing and the extension sheet feeder 50, the ceiling 64 of the recessed hand grip 60 is hooked on the convex ribs 64*a*. The tip end 75*a* of the elastic piece 75 as the hook repeats to be hooked and released while the securing member 70 is inserted for attachment. When insertion of the securing member 70 is completed, as illustrated in FIG. 10, the tip end 75*a* as the hook is hooked on one of the convex ribs 64*a* on a relatively rear side of the recessed hand grip 60. Thus, the securing member 70 is temporarily secured. That is, the elastic piece 75 and the convex rib 64*a* serve as a temporary securing structure that includes convex portions or concave portions formed on the ceiling 64 as an internal wall surface orthogonal to the side surface of the recessed hand grip 60 and engagement portions that engage with the convex portions or the concave portions formed on the securing member 70 as the cover. The elastic piece 75 serves as the engaging portion that is elastically displaceable in a direction orthogonal to ceiling 64 as the inner wall surface. The inner wall surface is not limited to the ceiling 64 as long as the inner wall surface is orthogonal to the side surface of the recessed hand grip 60. However, in the example illustrated in FIG. 10, the convex portions for slip prevention also exhibit a function of the convex portions for temporary securing of the securing member 70.

The main-unit housing 1 is mounted on the two extension sheet feeders 50 stacked in two stages as illustrated in FIGS. 4 and 5 and each of two lateral positions of the main-unit housing 1 are secured by the recessed hand grip 60 and the securing member 70, each having substantially the same structure with the other recessed hand grip 60 and the other securing member 70 disposed on the opposite side surface of the main-unit housing 1 is mounted on the two extension sheet feeders 50. In such a structure, the lower housing includes the recessed hand grip 60 disposed on each of the side surfaces of the lower housing and is placed on another housing. The other housing includes a cover that covers at least a part of the recessed hand grip 60 of the lower housing and the cover has a substantially same structure as the cover disposed on the lower housing. Also, in such a structure, a temporary securing structure having substantially a same structure as the above-described temporary securing structure is formed between the cover and the lower housing.

As described above, according to the embodiments of the present disclosure, the securing member 70 includes the tip end 75*a* as the hook. When the securing member 70 is secured immediately before screwing, the tip end 75*a* as the hook of the securing member 70 is hooked on one of the convex portions, i.e., convex ribs 64*a* of the recessed hand grip 60 and the securing member 70 can be temporarily secured. Accordingly, the screwing operation can be easily performed. In the above description, the securing member 70 including the coupling portion that couples the securing member 70 with the upper housing serves as the cover that covers a part or all of the opening of the recessed hand grip 60. However, the cover may be a simple cover that does not include such a coupling portion.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

This patent application is based on and claims priority to Japanese Patent Application No. 2021-038407, filed on Mar. 10, 2021, in the Japan Patent Office, the entire disclosure of which is hereby incorporated by reference herein.

REFERENCE SIGNS LIST

1: main-unit housing
2: photoconductor
3: bypass sheet feeding tray
5: securing device
7: image forming unit
10: image forming device
11: main-unit sheet feeding roller
12: main-unit conveyance roller pair
13: registration roller pair
14: transfer roller
16: ejection roller pair
17: sheet feeding roller
18: main-unit conveyance path
19: output tray
21: main-unit sheet-feed conveyance path
30: main-unit sheet tray
32: main-unit sheet tray housing
33: main-unit sheet tray conveyance path
34: main-unit feed separation roller
36: main-unit sheet stacker
3*a*: sheet feeding tray exterior cover
45: main-unit sheet feed guide
47: extension sheet feed guide
50: extension sheet feeder
51: extension sheet feeding roller
52: extension sheet tray
53: extension sheet tray housing
54: extension sheet tray conveyance path
55: extension sheet feeding separation roller
56: extension sheet stacker
57: extension conveyance roller pair
60: recessed hand grip
61: recess
62: opening
63: surface portion
64: ceiling
70: securing member
71: insertion portion
72: screw fastening portion

73: screw
74: protrusion
75: elastic piece
76: thin portion
100: printer
200: sheet feeder
**61*a***: screw fastening portion
**64*a***: convex rib
**72*a***: openings
**74*a***: rib
**75*a***: tip end

The invention claimed is:

1. A housing structure comprising:
a lower housing;
an upper housing configured to be mounted on the lower housing, the upper housing including a recessed hand grip on a side surface of the upper housing;
a cover configured to cover at least a part of the recessed hand grip in the upper housing,
the cover configured to be attached and secured to the lower housing from a direction perpendicular to the side surface of the upper housing, and
the cover including at least a part of a temporary securing structure between the upper housing and the cover; and
the temporary securing structure configured to temporarily secure the cover to the upper housing in response to the cover being attached from the direction perpendicular to the side surface of the upper housing, and the temporary securing structure including,
a convex portion or a concave portion on an inner wall surface of the cover orthogonal to the side surface of the recessed hand grip, and
an engagement portion on the cover, the engagement portion configured to engage with the convex portion or the concave portion, wherein
the inner wall surface of the cover is a ceiling of the recessed hand grip,
the ceiling includes a plurality of ribs including the convex portion or the concave portion,
the plurality of ribs are side by side in the direction perpendicular to the side surface of the upper housing, and the plurality of ribs extend in a width direction of the recessed hand grip, and
at least one rib of the plurality of ribs is configured to engage with a tip end of the engagement portion on the cover.

2. The housing structure according to claim 1, wherein the tip end of the engagement portion is configured to be elastically displaceable in a direction perpendicular to the inner wall surface.

3. The housing structure according to claim 1, wherein the cover includes a first portion thinner than a second portion in a periphery of the cover.

4. The housing structure according to claim 1, wherein the cover includes a coupling portion configured to couple with the upper housing.

5. The housing structure according to claim 3, wherein the cover is configured to be removable from the upper housing in response to insertion of a tool in a clearance formed by the first portion thinner in the periphery of the cover and the recessed hand grip.

6. The housing structure according to claim 4, wherein the coupling portion is configured to restrict movement of the upper housing.

7. The housing structure according to claim 1, wherein the cover is configured to be secured with a screw.

8. The housing structure according to claim 1, further comprising:
a second lower housing;
the lower housing includes a recessed hand grip on a side surface of the lower housing and is placed on the second lower housing;
the second lower housing includes a second cover configured to cover at least a part of the recessed hand grip of the lower housing;
the second cover has a same structure as the cover attached to the lower housing;
the second cover includes at least a part of a second temporary securing structure between the second cover and the lower housing; and
the second temporary securing structure has a same structure as the temporary securing structure.

9. The housing structure according to claim 1, wherein the cover further includes:
at least one insertion portion configured to,
engage with at least one opening included in the recessed hand grip, and
restrict movement of the upper housing in a vertical direction and a horizontal direction in response to the at least one insertion portion being engaged with the at least one opening included in the recessed hand grip.

10. The housing structure according to claim 1, wherein
the tip end of the engagement portion is on an upper surface of the cover; and
the tip end of the engagement portion includes a hook portion, the hook portion oriented orthogonal to the upper surface of the cover.

11. An image forming apparatus comprising:
at least one image forming device configured to form at least one image on a recording medium;
a lower housing;
an upper housing configured to be mounted on the lower housing, the upper housing including a recessed hand grip on a side surface of the upper housing;
a cover configured to cover at least a part of the recessed hand grip in the upper housing,
the cover configured to be attached and secured to the lower housing from a direction perpendicular to the side surface of the upper housing, and
the cover including at least a part of a temporary securing structure between the upper housing and the cover; and
the temporary securing structure configured to temporarily secure the cover to the upper housing in response to the cover being attached from the direction perpendicular to the side surface of the upper housing, and the temporary securing structure including,
a convex portion or a concave portion on an inner wall surface of the cover orthogonal to the side surface of the recessed hand grip, and
an engagement portion on the cover, the engagement portion configured to engage with the convex portion or the concave portion, wherein
the inner wall surface of the cover is a ceiling of the recessed hand grip,
the ceiling includes a plurality of ribs including the convex portion or the concave portion,
the plurality of ribs are side by side in the direction perpendicular to the side surface of the upper housing, and the plurality of ribs extend in a width direction of the recessed hand grip, and at least one rib of the plurality of ribs is configured to engage with a tip end of the engagement portion on the cover.

12. The image forming apparatus according to claim 11, further comprising:

a main housing, the main housing including the upper housing, the upper housing including a sheet tray; and wherein the lower housing is an additional sheet tray.

13. The image forming apparatus according to claim 11, wherein the tip end of the engagement portion is configured to be elastically displaceable in a direction perpendicular to the inner wall surface.

14. The image forming apparatus according to claim 11, wherein the cover includes a first portion thinner than a second portion in a periphery of the cover.

15. The image forming apparatus according to claim 11, wherein the cover includes a coupling portion configured to couple with the upper housing.

16. The image forming apparatus according to claim 15, wherein the coupling portion is configured to restrict movement of the upper housing.

17. The image forming apparatus according to claim 11, wherein the cover is configured to be secured with a screw.

18. The image forming apparatus according to claim 11, further comprising:

a second lower housing;

the lower housing includes a recessed hand grip on a side surface of the lower housing and is placed on the second lower housing;

the second lower housing includes a second cover configured to cover at least a part of the recessed hand grip of the lower housing;

the second cover has a same structure as the cover attached to the lower housing;

the second cover includes at least a part of a second temporary securing structure between the second cover and the lower housing; and the second temporary securing structure has a same structure as the temporary securing structure.

19. The image forming apparatus according to claim 11, wherein the cover further includes:

at least one insertion portion configured to, engage with at least one opening included in the recessed hand grip, and restrict movement of the upper housing in a vertical direction and a horizontal direction in response to the at least one insertion portion being engaged with the at least one opening included in the recessed hand grip.

20. The image forming apparatus according to claim 11, wherein the tip end of the engagement portion is on an upper surface of the cover; and the tip end of the engagement portion includes a hook portion, the hook portion oriented orthogonal to the upper surface of the cover.

* * * * *